(12) United States Patent
Belcher

(10) Patent No.: US 6,859,485 B2
(45) Date of Patent: Feb. 22, 2005

(54) GEOLOCATION SYSTEM WITH CONTROLLABLE TAGS ENABLED BY WIRELESS COMMUNICATIONS TO THE TAGS

(75) Inventor: Donald K. Belcher, Rogersville, TN (US)

(73) Assignee: Wherenet Corporation, Santa Clara, CA (US)

( * ) Notice: Subject to any disclaimer, the term of this patent is extended or adjusted under 35 U.S.C. 154(b) by 550 days.

(21) Appl. No.: 09/798,837

(22) Filed: Mar. 2, 2001

(65) Prior Publication Data

US 2002/0094012 A1 Jul. 18, 2002

Related U.S. Application Data

(60) Provisional application No. 60/187,619, filed on Mar. 7, 2000.

(51) Int. Cl.[7] .................................. H04B 1/713
(52) U.S. Cl. ................. 375/130; 375/140; 375/146; 375/147; 375/142; 375/343
(58) Field of Search .................. 375/130, 133, 375/135, 136, 140–145, 147, 150, 343, 137, 219, 295–315, 316–352; 342/450, 465, 463

(56) References Cited

U.S. PATENT DOCUMENTS

| | | | | |
|---|---|---|---|---|
| 5,506,864 A | | 4/1996 | Schilling | 375/205 |
| 5,663,956 A | * | 9/1997 | Schilling | 370/335 |
| 5,745,037 A | * | 4/1998 | Guthrie et al. | 340/573.4 |
| 5,825,835 A | * | 10/1998 | Kingston et al. | 375/367 |
| 5,844,482 A | * | 12/1998 | Guthrie et al. | 340/572.4 |
| 5,920,261 A | * | 7/1999 | Hughes et al. | 340/568.8 |
| 5,920,287 A | | 7/1999 | Belcher et al. | 342/450 |
| 5,959,568 A | * | 9/1999 | Woolley | 342/42 |
| 5,995,046 A | | 11/1999 | Belcher et al. | 342/450 |
| 6,005,886 A | * | 12/1999 | Short | 375/141 |
| 6,236,365 B1 | | 5/2001 | LeBlanc et al. | 342/457 |
| 6,362,737 B1 | * | 3/2002 | Rodgers et al. | 340/572.1 |

* cited by examiner

*Primary Examiner*—Chieh M. Fan
*Assistant Examiner*—Jason M. Perilla
(74) *Attorney, Agent, or Firm*—Allen, Dyer, Doppelt, Milbrath & Gilchrist, P.A.

(57) ABSTRACT

An auxiliary wireless communication mechanism is incorporated into a system that geolocates tagged objects within a monitored environment, using random, repetitive spread spectrum emissions from the tags. The emissions are detected at tag emission readers, and processed by an object location processor to geolocate the tagged objects. The auxiliary wireless communication mechanism transmits a return spread spectrum signal containing information intended for a tag immediately in response to the object location processor geolocating the tag. This immediately returned spread spectrum transmission allows a reduced complexity spread spectrum receiver within the tag to despread the return signal without having to determine the timing of the clock signal used to produce it.

28 Claims, 5 Drawing Sheets

GEOLOCATION SYSTEM WITH CONTROLLABLE TAGS ENABLED BY WIRELESS COMMUNICATIONS TO THE TAGS

CROSS-REFERENCE TO RELATED APPLICATIONS

The present application claims the benefit of co-pending U.S. Provisional Patent Application, Ser. No. 60/187,619 filed Mar. 7, 2000, by Donald K. Belcher, entitled: "Geo-Location System With Controllable Tags Enabled by Wireless Communications to the Tags," assigned to the assignee of the present application and the disclosure of which is incorporated herein.

FIELD OF THE INVENTION

The present invention relates in general to a radio-tagged object location and tracking system of the type described in the U.S. Patents to Belcher et al, U.S. Pat. Nos. 5,920,287 and 5,995,046, (hereinafter referred to as the '287 and '046 patents, respectively), assigned to the assignee of the present application and the disclosures of which are incorporated herein. The system described in the '287 and '046 patents employs a plurality of tag transmission readers geographically distributed within and/or around a tag monitoring area. The readers are coupled to an object location processor, which executes time-of-arrival differentiation of first-to-arrive spread spectrum transmissions from tags as detected by the readers. The present invention is particularly directed to a scheme for automatically conducting a return spread spectrum transmission to a radio-tagged object from a selected transmitter site within the tag monitoring area.

BACKGROUND OF THE INVENTION

The general architecture of the radio tagged object geolocation systems described in the above-referenced '287 and '046 Patents is diagrammatically shown in FIG. 1 as comprising a plurality of tag emission readers 10 that are installed at precisely geographically known and relatively unobtrusive locations in and/or around the perimeter of an asset management environment 12. The asset management environment contains a plurality of objects/assets 14, to which radio-containing 'tags' 16 are affixed. As a result of radio emissions from the tags 16, the locations of the objects 14 can be monitored on a continuous basis by the readers 10 and reported to an asset management data base 20. This data base is accessible by way of a computer workstation or personal computer 26.

In order that the system may locate and track the objects, each radio tag 16 (a circuitry implementation of which is schematically shown in FIG. 2) is operative to repeatedly transmit or 'blink' a short duration, wideband (spread spectrum) pulse of RF energy, that is encoded with the identification of its associated object and other information stored in a tag memory. These short duration tag emissions are detected by the tag emission readers 10.

Each tag reader 10 is coupled to an associated reader output processor of an RF processing system 24, which correlates the spread spectrum signals received from a tag with a set of spread spectrum reference signal patterns, in order to determine which spread spectrum signals received by the reader is a first-to-arrive spread spectrum signal burst transmitted from a tag. The first-to-arrive signals are coupled to an object geolocation processor, which performs time-of-arrival differentiation of the detected first-to-arrive transmissions, and locates (within a prescribed spatial resolution, e.g., on the order of ten feet) the tagged object of interest.

The circuitry of a radio tag 16 is schematically illustrated in FIG. 2 as comprising an RF transmitter 40, that includes a relatively coarse oscillator 41, whose output is fed to a first 'slow' pseudo random pulse generator 42 and to a strobe pulse generator 44. The strobe generator 44 comprises a time out circuit 46 and a delay circuit 48, the output of which is a low energy receiver enable pulse having a prescribed duration (e.g., one-second wide). This enable pulse is used to controllably strobe a receiver 50, such as a crystal video detector, that is used to detect query signals sourced from a relatively 'short range' (e.g., on the order of ten to fifteen feet) low power interrogation unit (such as a hand held wand). Such a low power interrogation unit may be used to more precisely pinpoint an object, for example as an industrial part that may be surrounded by a 'sea' of similar parts.

To detect query signals from the interrogating unit, the receiver 50 has its input coupled to a receive port 52 of a transmit/receive switch 54, a bidirectional RF port 56 of which is coupled to an antenna 60. The transmit/receive switch 54 has a transmit port 62 coupled to the output of an RF power amplifier 64, which is powered up only during 'blink' mode of operation of the tag.

The output of the 'slow' pseudo random pulse generator 42 is a series of relatively low repetition rate, randomly occurring 'blink' pulses that are coupled to a high speed PN spreading sequence generator 73 via an OR gate 75. The occurrences of these blink pulses define when the tag will randomly transmit bursts of wideband (spread spectrum) RF energy to be detected by the tag emission readers 10. When enabled by a 'blink' pulse, the high speed PN spreading sequence generator 73 generates a spreading sequence of PN chips.

The PN spreading sequence generator 73 is driven at the RF frequency output of a crystal oscillator 82, which provides a reference frequency for a phase locked loop (PLL) 84, establishing a prescribed RF output frequency (for example a frequency of 2.4 GHz, to comply with FCC licensing rules). The RF output frequency produced by PLL 84 is coupled to a first input 91 of a mixer 93, the output 94 of which is coupled to the RF power amplifier 64. Mixer 93 has a second input 95 coupled to the output 101 of a spreading sequence modulation exclusive-OR gate 103. A first input 105 of exclusive-OR gate 101 is coupled to receive the PN spreading chip sequence generated by the PN generator 73.

A second input 107 of OR gate 101 is coupled to receive the respective bits of data stored in a tag data storage memory 110, which are clocked out by the PN spreading sequence generator 73. The tag memory 110 may store parameter data provided by an associated sensor 108 and supplied by a data select logic circuit 109. The data select logic circuit 109 is further coupled to receive data transmitted to the tag from a short range interrogating unit, as decoded by a command and data decoder 112, coupled to the output of the crystal video receiver 50.

A 'wake-up' comparator 114 compares the tag address of a query transmission from an interrogation wand with the tag's identification code stored in memory 110. If the two codes match, the comparator causes data in the query message to be decoded by the command and data decoder 112, and written into memory 110 via data select logic circuit 109. The comparator 114 is further coupled through OR gate 75 to the enable input of the PN generator 73, so that, in response to a query message to the tag, its transmitter 40 will generate a response RF burst, in the same manner as it randomly and repeatedly 'blinks' a PN spreading sequence transmission containing its identification code and any parameter data stored in memory 110, as described above.

Now, although the tag radios employed in the geolocation system described in the '287 and '046 patents contain circuitry capable of detecting a low energy query signal from a relatively close, low powered interrogator unit, they are not configured to detect (FCC-compliant) communication signals sourced from a relatively remote location, such as, but not limited to, any of the tag emission readers distributed within the infrastructure of the geolocation system.

The ability of a tag to receive a remote communication signal (which implies the use of a higher energy signal) from any location in the geolocation system is very desirable, as it would impart substantial versatility and enhanced functionality to the system. For example, it would allow a tag emission reader to validate reception of a specific tag transmission. (Advantageously, the tag-to-infrastructure communications reliability of the geolocation system of the '287 and '640 patents is inherently very high, since the readers are arranged to ensure that a transmission from any tag will always be received by at least three and preferably four readers.) Communicating remotely to any tag would also allow the system's supervisory computer to initiate a transmission containing information for changing a stored tag parameter (such as its blink rate), or performing an auxiliary function, such as activating a visual or audible indicator installed on the tag.

To be compliant with the extremely limited FCC energy constraints for unlicensed communications (e.g., FCC regulation 15.247), the increased energy required for successfully performing non short range communications mandates the use of some form of spread spectrum modulation. This, in turn, implies the need for what is typically a substantially complex and prohibitively expensive addition to the tag's receiver circuitry, since spread spectrum receivers must be synchronized to the incoming signal to a very high degree of accuracy.

SUMMARY OF THE INVENTION

The desire to remotely communicate with a tag using an FCC compliant spread spectrum signal is successfully achieved in accordance with the present invention, by taking advantage of the very precise geolocation measuring functionality of the readers and associated processing subsystems of the '287 and '046 patents, to immediately initiate a 'tag clock-synchronized' transmission of a return spread spectrum burst from a remote transmitter back to a tag. By tag clock-synchronized spread spectrum transmission is meant one which, when received by the tag, is effectively assured of being time-aligned or synchronized with the receiving tag's internal clock to enable the received signal to be coupled directly to a relative simple exclusive-OR gate configured despreader for recovery of the data in the return burst. This not only serves to reduce tag hardware complexity, but minimizes the length of time the tag's receiver must be activated, thereby decreasing tag power consumption.

The remote transmitter from which a return burst is sourced is selected from a plurality of auxiliary spread spectrum transmitters distributed in and or around the monitored environment at fixed geo-coordinates, such as, but not limited to the locations of the tag readers. The selection of and triggering of a return burst from an auxiliary transmitter is controlled by the geolocation system processor, which has determined the exact location of the tag on the basis of first-to-arrive signals from multiple tag emission readers. Since it knows the location of the tag of interest based upon the time of arrival of that tag's spread spectrum burst, the geolocation processor also knows the exact time of transmission of the blink from the tag, and thereby the timing of the tag's internal clock on which the tag's spread burst was based.

This, coupled with the fact that the system processor knows the travel time from any selected transmission site of a return message back to the known location of the tag, enables the system processor to effectively immediately initiate the transmission of a return spread spectrum burst from a selected auxiliary transmitter site at the exact instant that will ensure that the return burst will arrive at the tag within a very short window after the tag burst so that is effectively be in time alignment with the tag's internal clock.

The modification of the tag's transceiver circuitry involves a relatively minor addition of a delay strobe and a relatively simple spread spectrum demodulator, that relies upon the expectancy that a return burst from an auxiliary transmitter will arrive at the tag within a very short window of time after the tag 'blink', during which the tag's internal crystal oscillator is not expected to effectively change (drift).

DETAILED DESCRIPTION

Figure 1:
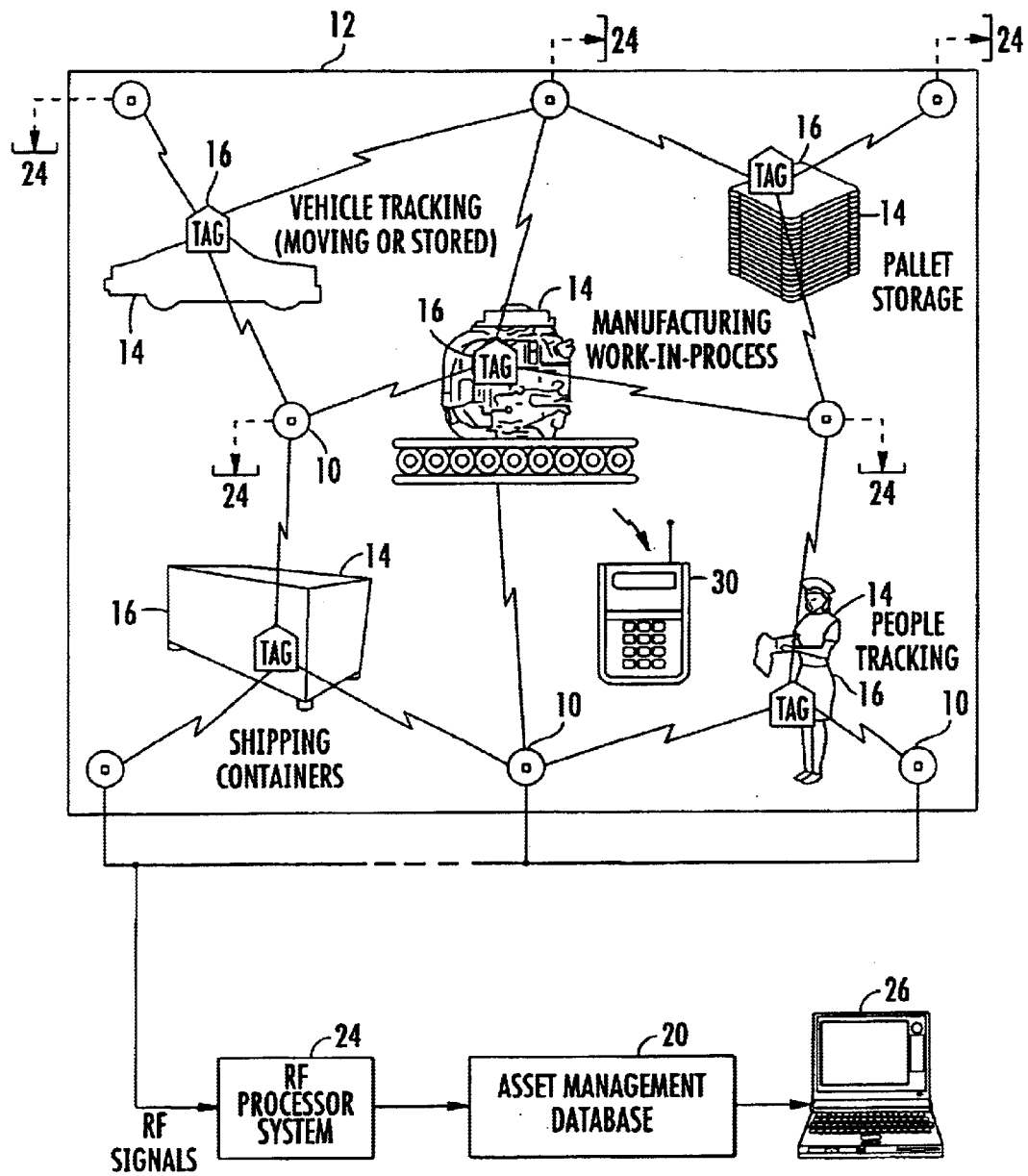
FIG. 1 diagrammatically illustrates the general architecture of a tagged object tracking and location system detailed in the above-referenced '287 and '046 patents.

Before detailing the 'tag clock-synchronized' return burst transmission scheme of the present invention, it should be observed that the invention is primarily directed to an augmentation to a geolocation system of the type disclosed in the above-referenced Belcher et al '287 and '046 Patents. A first aspect of this augmentation is directed to a modification of the geolocation system's infrastructure that involves the placement in and or around the monitored environment of one or more auxiliary spread spectrum transmitters, whose geo-coordinates are very precisely known (such as, but not limited to the locations of the tag readers). Advantageously, as a complexity and cost reduction measure, the circuitry of these auxiliary transmitters may employ effectively the same transmission architecture as those of the radio tags employed in the above-referenced Belcher et al patents and described previously with reference to FIG. 2.

Operation of a selected auxiliary transmitter is controlled by the geolocation system processor, which has determined the exact location of the tag on the basis of first-to-arrive signals from multiple tag emission readers, as described above, and detailed in the '287 and '046 patents. Since the geolocation system processor knows the location of the tag of interest based upon the time of arrival of that tag's spread spectrum burst (whose frequency is also known), it also knows the exact time of transmission (e.g., termination edge) of the burst from the tag, and thereby the timing of the tag's internal clock on which the tag's spread burst was based.

The system processor thereby knows the travel time from any selected transmission site (whose location is fixed and known) of a return message back to the known location of the tag. This knowledge enables the system processor to effectively immediately initiate the transmission of a return spread spectrum burst from a selected auxiliary transmitter site at the same frequency as the tag and at the exact moment in time that will ensure that the return burst will arrive at the tag within a very short window after the tag burst so as to effectively be in time alignment with the tag's internal clock.

A second aspect of this augmentation includes a reduced hardware complexity modification of the tag's internal transceiver circuitry to incorporate a relatively simple spread spectrum demodulator. This demodulator relies upon the effective assurance that a return burst from an auxiliary transmitter will arrive at the tag within a very short window of time after the tag 'blink', during which the tag's internal crystal oscillator is not expected to effectively change (drift)

As such, the invention is readily implemented in an arrangement of conventional communication circuits and associated digital signal processing components and attendant supervisory control circuitry therefor, that controls the operations of such circuits and components. The configuration of these circuits components and the manner in which they interface with other communication system equipment have, therefore, been illustrated in readily understandable block diagram and schematic format, depicting only those details that are pertinent to the present invention, so as not to obscure the disclosure with details which will be readily apparent to those skilled in the art having the benefit of the description herein. Thus, the block diagram, circuit illustrations and associated timing diagram are primarily intended to show the major components of the tag-based geolocation system in a convenient functional grouping, whereby the present invention may be more readily understood.

Figure 2:
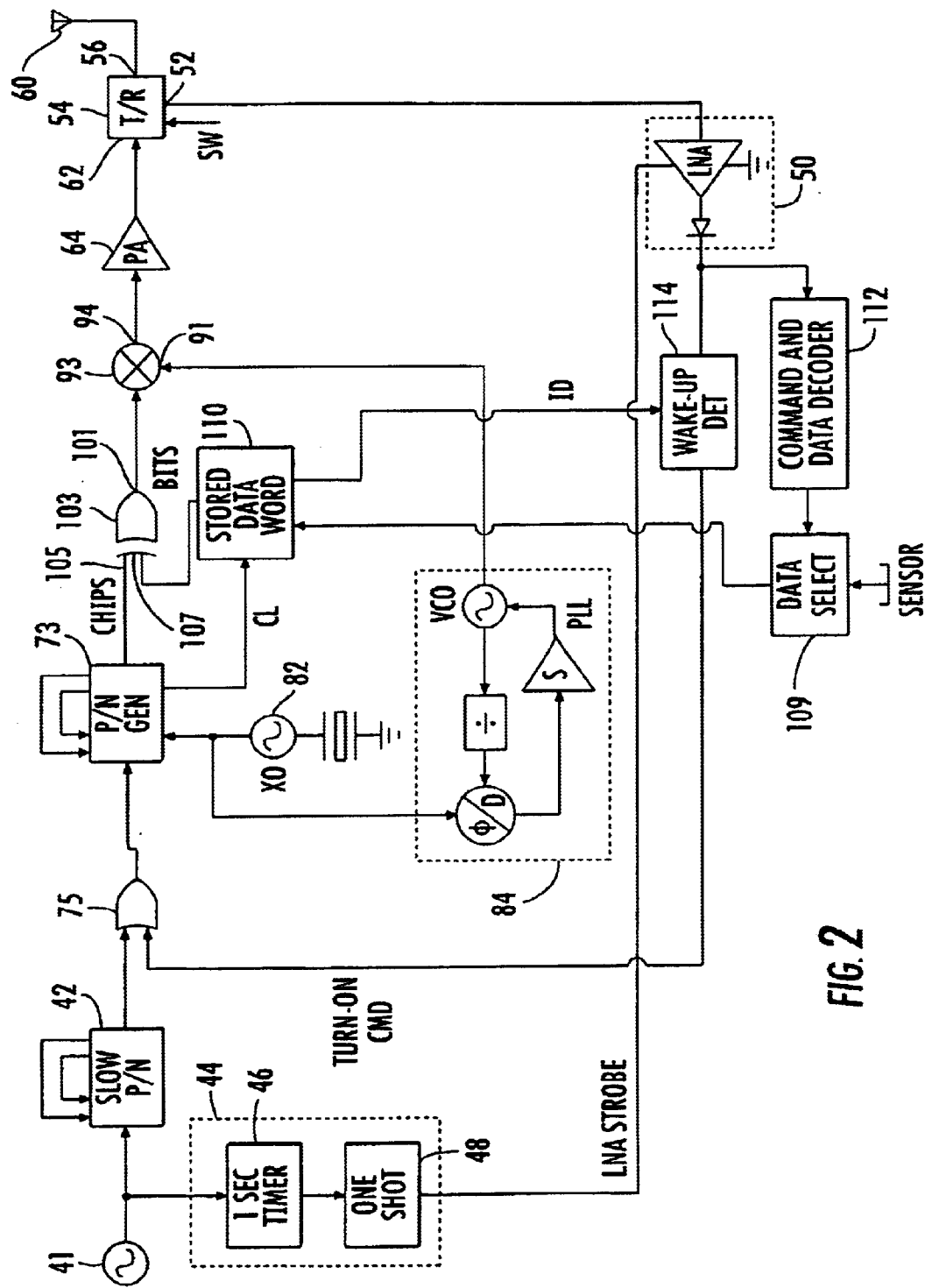
FIG. 2 shows the circuitry architecture of a tag transceiver unit employed in the system of FIG. 1.
Figure 3:
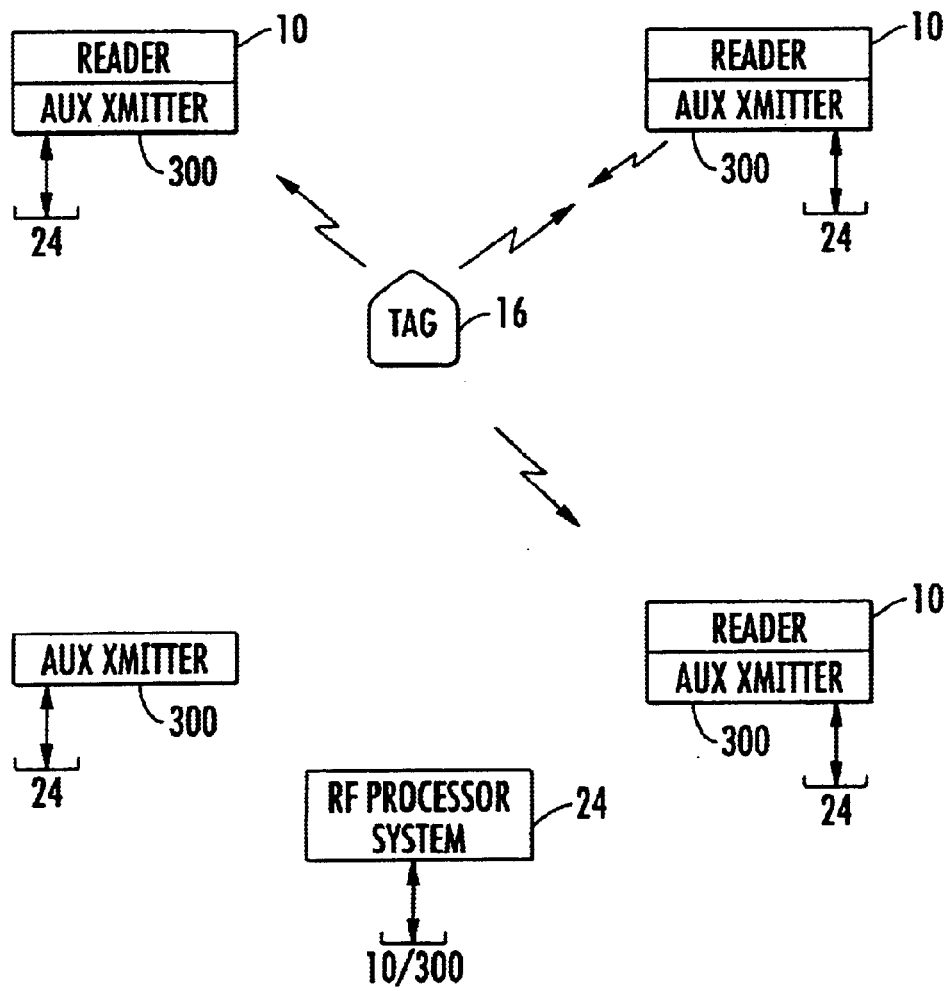
FIG. 3 is a reduced complexity diagrammatic illustration of a modification of the infrastructure of the geolocation system of the '287 and '046 patents, that places one or more auxiliary 'return burst' spread spectrum transmitters in and/or around the asset management environment.

Attention is now directed to FIG. 3, which is a reduced complexity diagrammatic illustration of a modification of the infrastructure of the geolocation system of the '287 and '046 patents, that places one or more auxiliary spread spectrum transmitters 300 in and/or around the asset management environment. As a non-limiting example, except for a tag radio's short range receiver section, the transmission circuitry of an auxiliary transmitter may correspond to the schematic diagram of FIG. 2, described above. As such, a repetitive description of that circuitry will not be provided here.

For purposes of providing a practical, non-limiting example, FIG. 3 shows the placement of auxiliary spread spectrum transmitters 300 at the same locations as each the tag readers 10. It should be understood, however, that the locations of the auxiliary transmitters 300 are not limited to the locations of the readers 10. The auxiliary transmitters may be placed anywhere within the monitored environment that allows communications to tags being tracked.

What is important is that, since the locations of auxiliary transmitters 300 are fixed and known, the object geolocation processor has knowledge of the distance and timing relationship between any auxiliary transmitter site and a geolocated tag. This knowledge enables the control processor to select the appropriate auxiliary transmitter site for sourcing the return burst to the tag, as well as the required timing of that burst to ensure synchronization of the burst with the receiving tag's internal clock.

Placing the auxiliary transmitters at the same locations as the tag readers is a very practical method of providing total 'return' coverage for the monitored asset management environment, since it associates the auxiliary transmitters with tag emission monitoring (reader) sites, which have been previously laid out in an arrangement that has been determined to ensure geolocation coverage for any tag being tracked. Moreover, although any auxiliary transmitter site within the 'view' of the tag may be selected as the source of the return transmission, a non-limiting, but preferred, choice of a transmitter site from which to generate a return burst is that site which is closest to the tag (and is currently not transmitting a return burst to another tag), in order to maximize the energy density of the return burst received at the tag.

Figure 4:
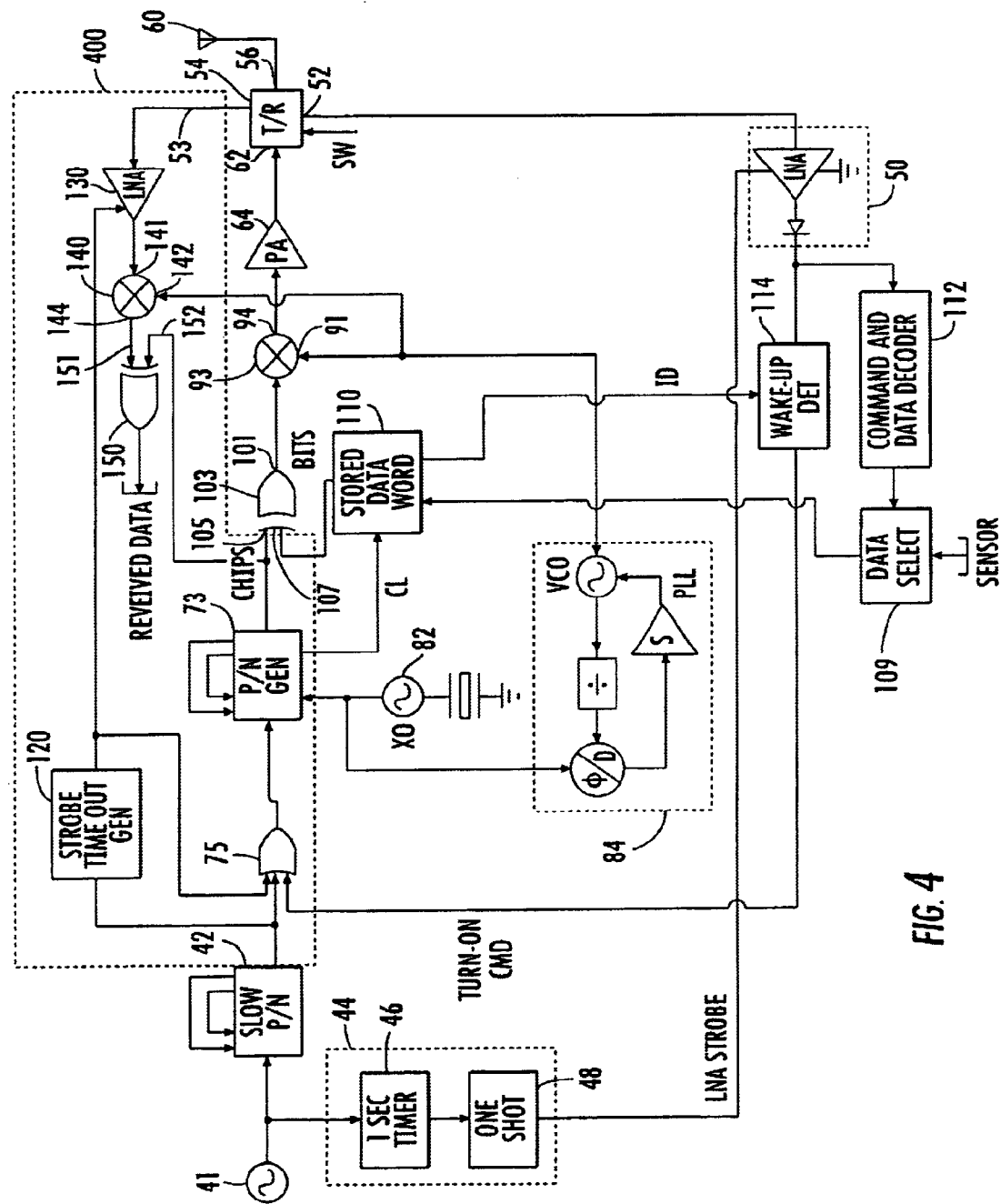
FIG. 4 shows a modification of the radio tag transceiver circuitry of FIG. 2, to incorporate a spread spectrum demodulator for despreading a spread spectrum 'return burst' from an auxiliary transmitter of the system shown in FIG. 3.

FIG. 4 shows a modification of the transceiver circuitry of a radio tag schematically illustrated in FIG. 2, described above, to incorporate a relatively simple spread spectrum demodulator, shown within broken lines 400. As pointed out above, this additional, reduced complexity, spread spectrum demodulator circuitry relies upon the arrival of the return burst from an auxiliary transmitter within a prescribed window of time immediately following a tag transmission burst, during which the tag's internal crystal oscillator 82 is not expected to have changed relative to the time of transmission of a 'blink' from that tag. Since the remainder of the tag transceiver corresponds to the schematic of FIG. 2, and has already been described with reference to that Figure, it will not be redescribed here.

The reduced complexity spread spectrum demodulator addition to a tag transceiver includes a return burst time-out or strobe generator 120 (which may be configured of a timer and one-shot similar to the strobe generator 44). Strobe generator 120 is coupled to receive the output pulse (shown at 501 in the timing diagram of FIG. 5) of the slow PN generator 42. The return burst strobe generator 120 provides a delayed output pulse (shown at 502 in the timing diagram of FIG. 5) having a duration that accommodates the transmission of a return burst (as shown at timing interval 503 in the timing diagram of FIG. 5), from any transmitter site 300 that may be selected and triggered by the object geolocation processor.

The output of the strobe generator 120 is coupled as an additional input to OR gate 75, and to an enable input of an auxiliary low noise amplifier (LNA) 130. The input of auxiliary LNA 130 is coupled to an auxiliary output 53 of transmit/receive switch 54, and its output is coupled to a first input 141 of an auxiliary mixer 140, which is used to down-convert the received RF return burst for descrambling by the chip sequence produced by high speed chip generator 73. As described above, the output of OR gate 75 is supplied as a control input to high speed chip generator 73 to generate a spreading sequence of PN chips at the frequency of the tag's internal crystal oscillator 82.

In addition to being coupled to mixer 93 within the tag's transmit path, the RF output frequency from the PLL 84 is coupled to a second input 142 of down-converting mixer 140. The output 144 of mixer 140 is coupled to a first input 151 of a despreading exclusive-OR gate 150. A second input 152 of exclusive-OR gate 150 is coupled to receive the PN spreading chip sequence generated by PN generator 73. The output 152 of exclusive-OR gate 150 is the despread data.

Figure 5:
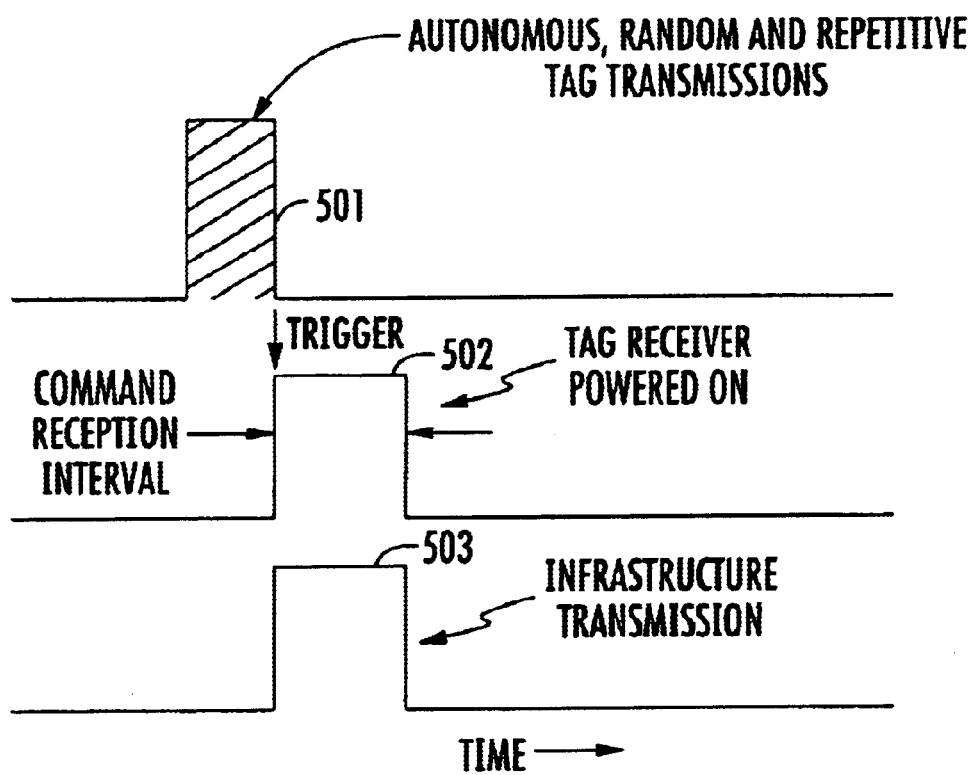
FIG. 5 is a timing diagram associated with the operation of the present invention.

The operation of the present invention may be readily understood with reference to the timing diagram of FIG. 5, parenthetically referenced in the description of the circuitry of FIG. 4. As explained above, and as shown at 502 in the timing diagram of FIG. 5, the burst time-out generator 120 initiates a delayed output pulse at the termination of the transmission blink output pulse produced by the tag's slow PN generator 42, shown at 501 in the timing diagram of FIG. 5. The extremely short duration of the delayed output pulse 502 is sufficient to accommodate an infrastructure return burst transmission interval, shown at 503 in the timing diagram of FIG. 5.

As described above, this infrastructure return burst transmission interval corresponds to the time required for the tag's blink to be received by a plurality of tag readers, having the first-to-arrive signals at those tag readers processed by the object geolocation processor to locate the tag, and then immediately triggering a selected transmitter 300 to transmit a return spread spectrum burst.

Because the return burst transmission from the selected transmitter of the system infrastructure's can be referenced to the termination of the tag transmission burst shown at 501 in FIG. 5, and occurs within the very short duration of the pulse produced by the return burst time-out generator 120, it can be inferred that the transmitter's internal oscillator (which is free-wheeling relative to the tag's internal crystal oscillator 82) is sufficiently close in time with the tag's internal oscillator 82, so as to enable accurate despreading and recovery by exclusive-OR gate 150 of the data encoded in the spreading sequence of the return burst received by the tag. This obviates the need to install what would otherwise be a substantially complex and prohibitively expensive addition to the tag's receiver circuitry in order to ensure that the tag's spread spectrum receiver is synchronized to the incoming signal.

As will be appreciated from the foregoing description, the present invention, the present invention provides a very effect mechanism for remotely communicating with a tag using an FCC compliant spread spectrum signal by taking advantage of the very precise geolocation measuring functionality of the readers and associated processing subsystems of the geolocation system described in the '287 and '046 patents, to immediately initiate a transmission of a return spread spectrum burst from a remote transmitter back to a tag, that is effectively assured of being time-aligned or synchronized with the receiving tag's internal clock. As a consequence, the downconverted return burst can be directly coupled to a relative simple exclusive-OR gate configured despreader for recovery of the data in the return burst. This not only serves to reduce tag hardware complexity, but minimizes the length of time the tag's receiver must be activated, thereby decreasing tag power consumption.

While I have shown and described an embodiment in accordance with the present invention, it is to be understood that the same is not limited thereto but is susceptible to numerous changes and modifications as known to a person skilled in the art, and I therefore do not wish to be limited to the details shown and described herein, but intend to cover all such changes and modifications as are obvious to one of ordinary skill in the art.

What is claimed is:

1. A method of operating a system for geolocating objects within a monitored environment, in which emissions from tags associated with said objects are detected at a plurality of spaced apart tag emission readers, and outputs of said tag emission readers are processed by an object location processor to geolocate said tags and thereby their associated objects within said monitored environment, said method comprising the steps of:

(a) in response to said object location processor geolocating a tag, initiating the transmisson of, from a location spaced apart from said tag, a spread spectrum signal containing information intended for said tag and relative to a prescribed attribute of an emission from said tag and relative to the time of termination of said emission from said tag as received by said tag emission readers; and (b) at said tag, receiving said spread spectrum signal transmitted in step (a) and recovering said information.

2. The method according to claim 1, wherein step (b) comprises despreading the received spread spectrum signal, without determining information representative of a clock signal used to produce said spread spectrum signal transmitted in step (a).

3. The method according to claim 1, wherein step (b) comprises despreading the received spread spectrum signal using a tag-resident clock generated independent of a clock signal used to produce said spread spectrum signal transmitted in step (a).

4. The method according to claim 1, wherein step (b) comprises enabling a despreading mechanism within said tag for a prescribed period of time following termination of said emission from said tag, and causing the enabled despreading mechanism to despread the received spread spectrum signal using a tag-resident clock generated independent of a clock signal used to produce said spread spectrum signal transmitted in step (a).

5. The method according to claim 1, wherein step (a) comprises transmitting said spread spectrum signal containing information intended for said tag from a location proximate to a tag emission reader.

6. A method for conducting wireless communications between a wireless communication tag, adapted for use with an object in an environment that is monitored by a system for geolocating objects therein, and a transmitter of said system, said method comprising the steps of:

(a) in said wireless communication tag, generating a spread spectrum signal in accordance with a tag-resident clock, and emitting said spread spectrum signal, so that said spread spectrum signal may be detected by a plurality of spaced apart tag emission readers, outputs of which are processed by an object location processor to geolocate said wireless communication tag and thereby said object within said monitored environment;

(b) in response to said object location processor geolocating said wireless communication tag, initiating the transmitting of, from a location spaced apart from said wireless communication tag, a return spread spectrum signal by a remote transmitter containing information intended for said tag wireless communication tag and relative to a prescribed attribute of an emission from said wireless communication tag and relative to the time of termination of said emission from said wireless communication tag as received by said tag emission readers; and (c) in said wireless communication tag, receiving said return spectrum signal transmitted from said remote transmitter in step (b), and despreading the return spread spectrum signal received from said remote transmitter, using said tag-resident clock employed in step (a).

7. The method according to claim 6, wherein step (c) comprises despreading the return spread spectrum signal received from said remote transmitter, without determining information representative of a clock signal used to produce the return spread spectrum signal transmitted by said remote transmitter in step (b).

8. The method according to claim 6, wherein step (c) comprises enabling a despreader that is operative to despread said return spread spectrum signal received from said remote transmitter during a prescribed period of time following termination of emission of said spread spectrum signal in step (a) using said tag-resident clock.

9. The method according to claim 6, wherein step (b) comprises transmitting said return spread spectrum signal from a location proximate to a tag emission reader.

10. A wireless communication subsystem adapted for use with a system for geolocating objects within a monitored environment, in which emissions from tags associated with said objects are detected at a plurality of spaced apart tag emission readers, and outputs of said tag emission readers are processed by an object location processor to geolocate said tags and thereby their associated objects within said monitored environment, said wireless communication subsystem comprising:

a spread spectrum transmitter associated with said object geolocation system and being adapted to transmit a return spread spectrum signal containing information intended for a tag in response to said object location processor geolocating said tag wherein said spread spectrum transmitted is operative to initiate transmission of said return spread spectrum signal relative to a prescribed timing attribute of an emission from said tag as received by said tag emission readers; and a spread spectrum receiver within said geolocated tag that is adapted to receive said return spread spectrum signal transmitted by said transmitter and to recover said information.

11. The wireless communication subsystem according to claim 10, wherein said spread spectrum receiver is adapted to despread said return spread spectrum signal transmitted from said spread spectrum transmitter, without determining information representative of a clock signal used to produce said return spread spectrum signal transmitted by said spread spectrum transmitter.

12. The wireless communication subsystem according to claim 10, wherein spread spectrum receiver is operative to despread said return spread spectrum signal using a tag-resident clock generated independent of a clock signal used to produce said return spread spectrum signal transmitted by said spread spectrum transmitter.

13. The wireless communication subsystem according to claim 10, wherein said spread spectrum receiver contains a despreading mechanism that is enabled for a prescribed period of time following termination of said emission from said tag, and is operative to despread said return spread spectrum signal using a tag-resident clock generated independent of a clock signal used to produce said return spread spectrum signal transmitted by said spread spectrum transmitter.

14. The wireless communication subsystem according to claim 10, wherein said spread spectrum transmitter is located proximate to a tag emission reader.

15. A method of operating a system for geolocating objects within a monitored environment, in which emissions from tags associated with said objects are detected at a plurality of spaced apart tag emission readers, and outputs of said tag emission readers are processed by an object location processor to geolocate said tags and thereby their associated objects within said monitored environment, said method comprising the steps of:

(a) initiating the transmission of, from a location spaced apart from said tags, a spread spectrum signal containing information intended for a one of said tags and relative to a prescribed attribute of an emission from said one of said tags and relative to the time of termination of said emission from said one of said tags as received by said tag emission readers; and (b) at said one of said tags, receiving said spread spectrum signal transmitted in step (a) and recovering said information.

16. The method according to claim 15, wherein step (b) comprises despreading the received spread spectrum signal, without determining information representative of a clock signal used to produce said spread spectrum signal transmitted in step (a).

17. The method according to claim 15, wherein step (b) comprises despreading the received spread spectrum signal using a tag-resident clock generated independent of a clock signal used to produce said spread spectrum signal transmitted in step (a).

18. The method according to claim 15, wherein step (b) comprises enabling a despreading mechanism within said tag for a prescribed period of time following termination of said emission from said tag, and causing the enabled despreading mechanism to despread the received spread spectrum signal using a tag-resident clock generated independent of a clock signal used to produce said spread spectrum signal transmitted in step (a).

19. The method according to claim 15, wherein step (a) comprises transmitting said spread spectrum signal containing information intended for said tag from a location proximate to a tag emission reader.

20. A method for conducting wireless communications between a wireless communication tag, adapted for use with an object in an environment that is monitored by a system for geolocating objects therein, and transmitter of said system, said method comprising the steps of:

(a) in said wireless communication tag, generating a spread spectrum signal in accordance with a tag-resident clock, and emitting said spread spectrum signal, so that said spread spectrum signal may be detected by a plurality of spaced apart tag emission readers, outputs of which are processed by an object location processor to geolocate said wireless communication tag and thereby said object within said monitored environment;

(b) initiating the transmission of from a location apart from said wireless communication tag by a remote transmitter, a return spread spectrum signal containing information intended for said wireless communication tag and relative to a prescribed attribute of an emission from said wireless communication tag and relative to a the time of termination of said emission from said wireless communication tag as received by said tag emission readers; and (c) in said wireless communication tag, receiving said return spread spectrum signal transmitted from said remote transmitter in step (b), and despreading the return spread spectrum signal received from said remote transmitter, using said tag-resident clock employed in step (a).

21. The method according to claim 20, wherein step (c) comprises despreading the return spread spectrum signal received from said remote transmitter, without determining information representative of a clock signal used to produce the return spread spectrum signal transmitted by said remote transmitter in step (b).

22. The method according to claim 20, wherein step (c) comprises enabling a despreader that is operative to despread said return spread spectrum signal received from said remote transmitter for a prescribed period of time following termination of emission of said spread spectrum signal in step (a) said tag-resident clock.

23. The method according to claim 20, wherein step (b) comprises transmitting said return spread spectrum signal from a location proximate to a tag emission reader.

24. A wireless communication subsystem adapted for use with a system for geolocating objects within a monitored environment, in which emissions from tags associated with said objects are detected at plurality of spaced apart tag emission readers, and outputs of said tag emission readers are processed by an object location processor to geolocate said tags and thereby their associated objects within said monitored environment, said wireless communication subsystem comprising:

a spread spectrum transmitter associated with said object geolocation system and being adapted to transmit a return spread spectrum signal containing information intended for a one of said tags, wherein said spread spectrum transmitter is operative to initiate transmission of said return spread spectrum signal relative to a prescribed timing attribute of an emission from said one of said tags as received by said tag emission readers; and a spread spectrum receiver within said one of said tags that is adapted to receive said return spread spectrum signal transmitted by said spread spectrum transmitter and recover said information.

25. The wireless communication subsystem according to claim 24, wherein said spread spectrum receiver is adapted to despread said return spread spectrum signal transmitted from said spread spectrum transmitter, without determining information representative of a clock signal used to produce said return spread spectrum signal transmitted by said spread spectrum transmitter.

26. The wireless communication subsystem according to claim 24, wherein said spread spectrum receiver is operative to despread said return spread spectrum signal using a tag-resident clock generated independent of a clock signal used to produce said return spread spectrum signal transmitted by said spread spectrum transmitter.

27. The wireless, communication subsystem according to claim 24, wherein said spread spectrum receiver contains a despreading mechanism that is enabled for a prescribed period of time following termination of said emission from said tag, and is operative to despread said return spread spectrum signal using a tag-resident clock generated independent of a clock signal used to produce said return spread spectrum signal transmitted by said spread spectrum transmitter.

28. The wireless communication subsystem according to claim 24, wherein said spread spectrum transmitter is located proximate to a tag emission reader.

* * * * *

UNITED STATES PATENT AND TRADEMARK OFFICE
CERTIFICATE OF CORRECTION

PATENT NO. : 6,859,485 B2
DATED : February 22, 2005
INVENTOR(S) : Donald K. Belcher It is certified that error appears in the above-identified patent and that said Letters Patent is hereby corrected as shown below:

<u>Column 5,</u>
Line 28, delete "(drift)" insert -- (drift). --.
Line 60, delete "each the" insert -- each of the --.

<u>Column 10,</u>
Line 53, delete "location apart" insert -- location spaced apart --.

Signed and Sealed this

Sixteenth Day of August, 2005

JON W. DUDAS
*Director of the United States Patent and Trademark Office*